US007000285B2

(12) United States Patent
Conner et al.

(10) Patent No.: US 7,000,285 B2
(45) Date of Patent: Feb. 21, 2006

(54) CONTROL CIRCUITRY FOR ENABLING DRIVE SYSTEM FOR VACUUM CLEANER

(75) Inventors: Michael P. Conner, Uniontown, OH (US); Steven J. Paliobeis, Painesville, OH (US); Robert A. Vystreil, Garrettsville, OH (US); Mark A. Pigza, Willoughby, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 346 days.

(21) Appl. No.: 10/339,097

(22) Filed: Jan. 9, 2003

(65) Prior Publication Data

US 2004/0134018 A1    Jul. 15, 2004

(51) Int. Cl.
A47L 5/28   (2006.01)
A47L 9/32   (2006.01)
(52) U.S. Cl. .................... 15/319; 15/340.2; 15/412
(58) Field of Classification Search ............... 15/319, 15/339, 350–353, 340.2, 412, DIG. 10; 200/50.32, 200/51 LM, 61.85; 368/935–937
See application file for complete search history.

(56) References Cited

U.S. PATENT DOCUMENTS

| | | | | |
|---|---|---|---|---|
| 1,356,663 A | * | 10/1920 | Spielman | .................. 200/61.85 |
| 1,447,814 A | * | 3/1923 | Paulus | ..................... 200/61.85 |
| 1,459,946 A | | 6/1923 | Camarata et al. | |
| 1,465,285 A | | 8/1923 | Peterson | |
| 2,619,209 A | | 11/1952 | Horn | |
| 2,814,063 A | | 11/1957 | Ripple | |
| 2,950,772 A | | 8/1960 | Dostal et al. | |
| 3,218,876 A | | 11/1965 | Berger | |
| 3,220,043 A | | 11/1965 | Lampe | |
| 3,451,495 A | | 6/1969 | Bayless et al. | |
| 3,581,591 A | | 6/1971 | Ziegler et al. | |
| 3,618,687 A | | 11/1971 | Ripple et al. | |
| 3,823,791 A | | 7/1974 | Sheler | |
| 3,854,164 A | | 12/1974 | Schmitz | |
| 3,896,892 A | | 7/1975 | Kohls et al. | |
| 3,938,216 A | | 2/1976 | Schmitz et al. | |
| 3,942,604 A | * | 3/1976 | Black, III | ................... 180/272 |
| 4,052,767 A | * | 10/1977 | Dutcher | ....................... 15/377 |
| 4,111,372 A | * | 9/1978 | Hicks et al. | ............... 241/37.5 |
| 4,249,281 A | | 2/1981 | Meyer et al. | |
| 4,342,369 A | | 8/1982 | Ransom | |
| 4,347,643 A | | 9/1982 | Bair, III | |
| 4,434,865 A | | 3/1984 | Tschudy et al. | |
| 4,615,071 A | | 10/1986 | Frohbieter | |
| 4,624,027 A | * | 11/1986 | Martin | ...................... 15/340.2 |
| 4,766,640 A | | 8/1988 | Martin et al. | |
| 5,042,109 A | | 8/1991 | Stephens | |

(Continued)

OTHER PUBLICATIONS

Website: Hitachi power semiconductor home page: http://www.hitachi.com.ip/pse, High-Voltage Monolithic IC, ECN3030F/3031F, PDE-3030F/31F-0, pp. 1-7 (2003).

*Primary Examiner*—Terrence R. Till
(74) *Attorney, Agent, or Firm*—Fay, Sharpe, Fagan, Minnich & McKee, LLP

(57) ABSTRACT

A self-propelled appliance comprises a base, electric motor mounting the base, a handle moveably depending from the base and a drive wheel mounted in the base and operatively connected to the motor. The control circuits comprising an enable switch and a base switch control the communication of power from the power supply to the motor relative to a gripping of the handle by a user of the appliance and a selective positioning of the handle relative to the base.

8 Claims, 4 Drawing Sheets

U.S. PATENT DOCUMENTS

| | | | |
|---|---|---|---|
| 5,056,175 A | 10/1991 | Stein et al. | |
| 5,077,823 A * | 12/1991 | Barry et al. | 388/819 |
| 5,115,537 A | 5/1992 | Meyer et al. | |
| RE34,286 E | 6/1993 | Toyoshima et al. | |
| 5,269,042 A | 12/1993 | Stephens et al. | |
| 5,285,550 A | 2/1994 | Meyer et al. | |
| 5,335,740 A | 8/1994 | Meyer et al. | |
| 5,339,916 A | 8/1994 | Louis | |
| 5,406,674 A | 4/1995 | Lawter et al. | |
| 5,455,886 A * | 10/1995 | Glenn et al. | 388/838 |
| 5,504,971 A | 4/1996 | McCormick | |
| 5,831,261 A * | 11/1998 | Plesko | 250/221 |
| 5,944,635 A * | 8/1999 | Butler, Jr. | 482/54 |
| 5,974,622 A | 11/1999 | Louis et al. | |
| 6,061,869 A | 5/2000 | Ettes et al. | |
| 6,102,022 A * | 8/2000 | Schave | 125/13.01 |
| 6,108,862 A | 8/2000 | Frederick et al. | |
| 6,169,258 B1 * | 1/2001 | Roney et al. | 200/332.2 |
| 6,449,792 B1 | 9/2002 | Myers | |
| 6,484,352 B1 | 11/2002 | Bobrosky et al. | |
| 6,741,051 B1 * | 5/2004 | Chu | 318/376 |
| 2002/0170137 A1 | 11/2002 | Coates et al. | |
| 2004/0134019 A1 | 7/2004 | Cipolla et al. | |
| 2004/0134020 A1 * | 7/2004 | Conner et al. | 15/340.2 |
| 2004/0135537 A1 * | 7/2004 | Conner et al. | 318/701 |
| 2005/0071056 A1 | 3/2005 | Tondra et al. | |

* cited by examiner

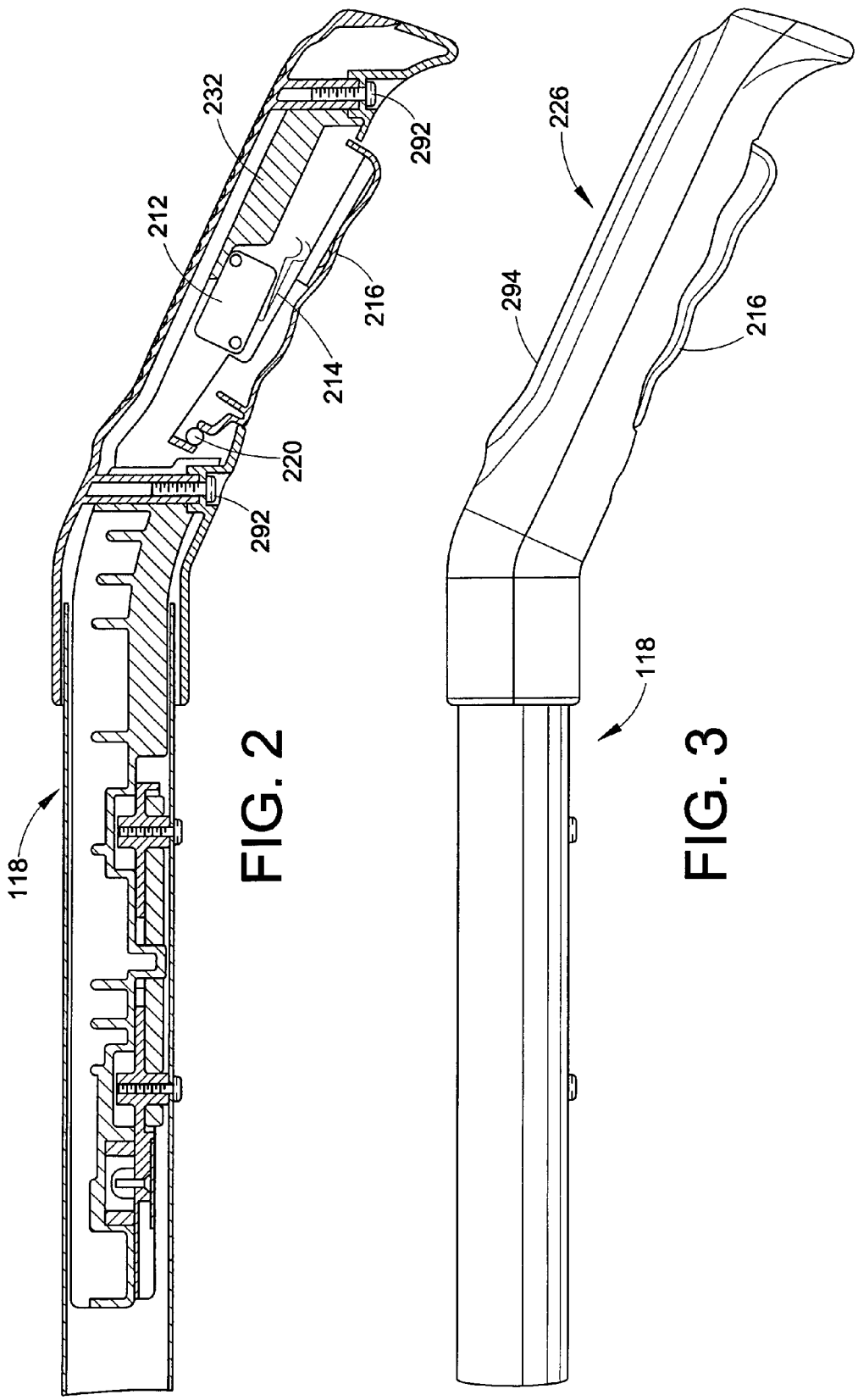

CONTROL CIRCUITRY FOR ENABLING DRIVE SYSTEM FOR VACUUM CLEANER

BACKGROUND

The invention is directed toward self-propelled appliances. The invention will be described in reference to a self-propelled vacuum cleaner. However, it should be understood that the invention can be applied in other self-propelled appliances. For example, the invention can be applied in self-propelled shampooers, sweepers, sanders, waxers, and lawn mowers.

Self-propelled appliances, such as, for example, self-propelled vacuum cleaners, include gearing mechanisms to provide motor power to drive wheels. For example, many self-propelled vacuum cleaners include one and/or a second motor to provide working air flow and propulsion to the drive wheels. Self-propelled vacuum cleaners often require clutches in order to provide forward and reverse gearing. Furthermore, some such vacuum cleaners include a limit switch/sensor for determining a handle position or other parameter that can be used to control motor operation for either the wheel drive or a revolving cleaning brush. For instance, movement of a handle to an upright storage position has been used as a basis to disable the brush movement.

In any self-propelled appliance device, there is always a need to provide improved better control of applied power to the drive mechanisms. The ability to interrupt power to the drive mechanism at a time when the user clearly does not intend to operate the appliance in a self-propelled state is important. A control system to effect this intent is of concern to a user not only for convenience, but also for safety.

Of particular safety concern is that at any time during normal operation of the appliance, if any of the circuitry were to fail, the motor and drive system could be locked into a fully forward or reverse state and cause injury to the user.

SUMMARY

A self-propelled appliance with an improved safety control system for disabling power communication to the drive wheels has been developed. The appliance includes a base, a handle moveably depending from the base, an electric motor mounted in the base or handle, a drive wheel mounted in the base and operatively connected to the motor, a control circuit for enabling the application of power to the drive wheels only in limited circumstances, and a base switch for interrupting the power of communication when the handle is disposed in a position indicating a non-drive usage. More particularly, the enable switch controls the communication of power from the power supply to the motor relative to a gripping of the handle by a user. The enable switch is disposed in a portion of the handle convenient for the gripping by the user and interrupts the power communication upon a release of the gripping. The base switch is disposed in the appliance base in a manner to identify a relative position between the handle and the base indicative of a non-drive use by the user. The base interrupts the power communication upon a disposition by the user of the handle in the relative position. Power to the motor is thus limited to circumstances including gripping and position adjustment of the handle indicative of intended drive wheel operation.

In accordance with another aspect of the invention, the enable switch comprises a lever arm extending from the handle portion and disposed for selective operation during user drive operation of the appliance. The enable switch may comprise a proximity switch for sensing the gripping of the handle by the user. In accordance with more limited aspects of the invention, the proximity switch may comprise one of a light sensor, magnetic sensor or heat sensor.

In accordance with another aspect of the present invention, the base switch is a limit switch comprising a cam operator solely dependent upon the handle position.

In accordance with yet another more limited aspect of the present invention, the appliance comprises a vacuum cleaner and the electric motor is a direct drive motor.

A particular advantage of the subject invention is a self-propelled appliance having improved control circuitry for enabling and disabling communication of power to the drive wheel componentry. The control circuitry is virtually undetectable by the user but requires the user to both grip and dispose the handle in other than a particular storage position to allow any communication of power to the drive wheel system.

Another advantage of the particular invention is the enhanced safety of operation as a result of requiring certain physical acts by user to enable power to the drive system, thereby avoiding accidental communication of power, even in the event of component failure.

Yet another advantage of the subject invention relates to a practical manufacturing concern since the improved control circuitry obviates detailed and expensive component testing to satisfy normal commercial component safety standards. The physical acts of the user which can disable, or enable, power communication to the drive wheel system, provides a level of safety which can avoid detailed component testing for a self-propelled system lacking the new and inventive control circuitry.

Other important features and operational advantages will become apparent to those of ordinary skill in the art upon a reading and understanding of the subject specification.

BRIEF DESCRIPTION OF THE DRAWINGS

The invention may take form in various components and arrangements of components, and/or in various procedures and arrangements of procedures. The drawings are only for purposes of illustrating preferred embodiments and are not to be construed as limiting the invention.

FIG. 2 is an elevation view and cutaway of a portion of the handle of the appliance of FIG. 1;

FIG. 3 is an elevation view of the portion of the handle of FIG. 2;

DETAILED DESCRIPTION OF THE PREFERRED EMBODIMENTS

Figure 1:
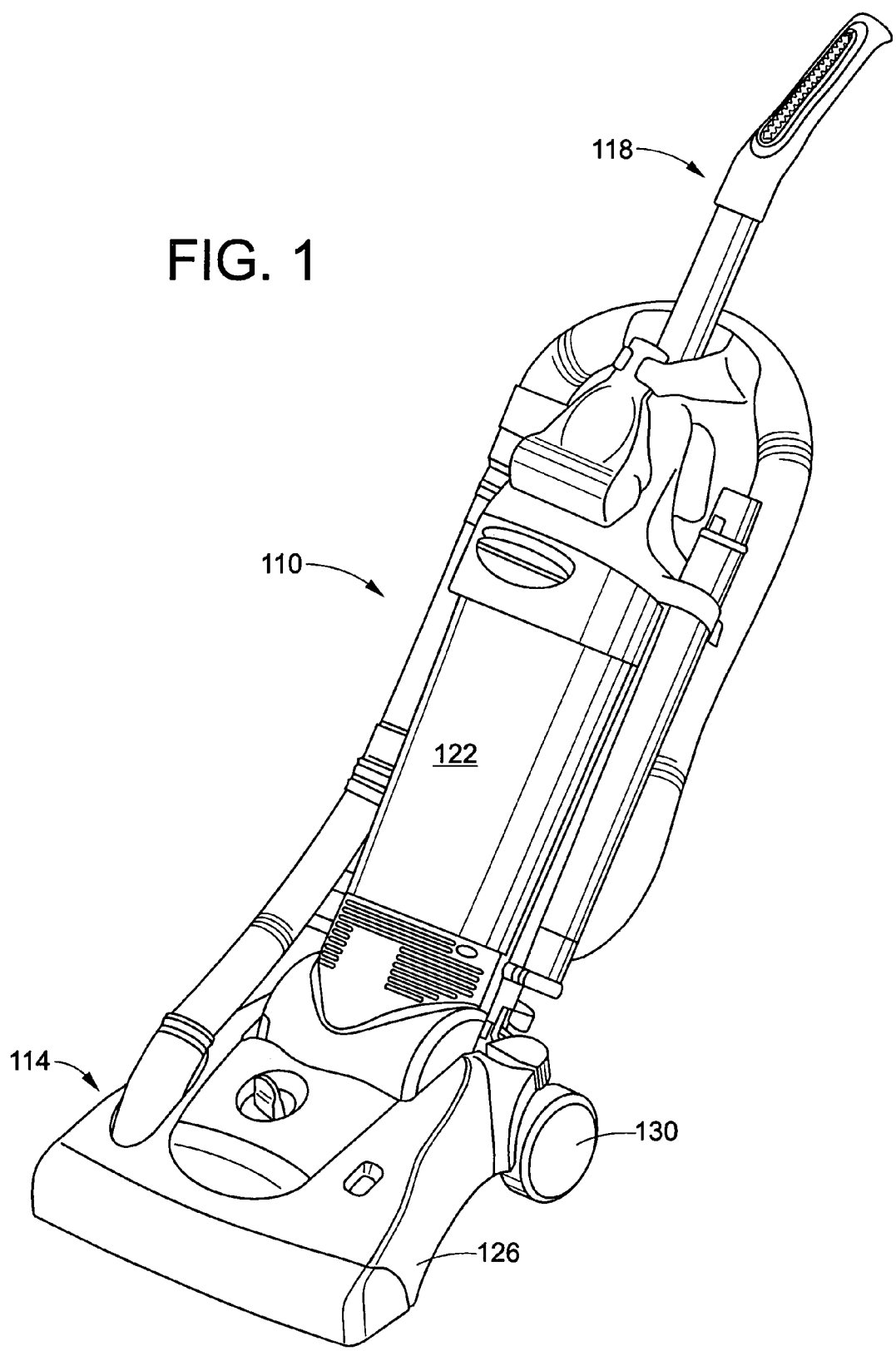
FIG. 1 is a perspective view of an exemplary appliance. The appliance is an upright vacuum cleaner.

Referring to FIG. 1, a self-propelled appliance 110 includes a base portion 114 and a handle portion 118. Typically, the base portion 114 includes a means such as drive wheels 116 for propelling the self-propelled appliance 110. Additionally, the base portion 114 may provide or house implements or actuators for performing the function of the appliance 110.

For example, where the appliance 110 is a vacuum cleaner 122, the base portion 114 may be a nozzle base 126. In addition to housing a means 116 for propulsion, the nozzle base 126 includes a nozzle through which dirt laden air is entrained. Dirt is removed from the air stream and collected in a bag, dirt separation chamber, or other portion of the vacuum cleaner 122. Additionally, the nozzle base 126 may include other implements for enhancing the functionality and usability of the vacuum cleaner 122. For example, the nozzle base may house brushes, beater bars and additional wheels 130 for improving the cleaning ability and maneuverability of the vacuum cleaner 122. Furthermore, the nozzle base 126 may house power supplies and control circuitry. Alternatively, power supplies and control circuitry may be located in other portions of the vacuum cleaner 122. For a more detailed description of the power supply and motor drive systems, reference is made to U.S. Ser. No. 10/339,122, entitled "Electronically Commutated Drive System For Vacuum Cleaner", filed contemporaneously herewith on Jan. 9, 2003, and hereby incorporated by reference.

The handle 118 provides a means for an operator to direct the operation of the appliance 110 or vacuum cleaner 122. For example, the handle 118 may be used to steer or direct the appliance 110 or vacuum cleaner 122. Additionally, the handle 118 may include control elements.

Figure 4:
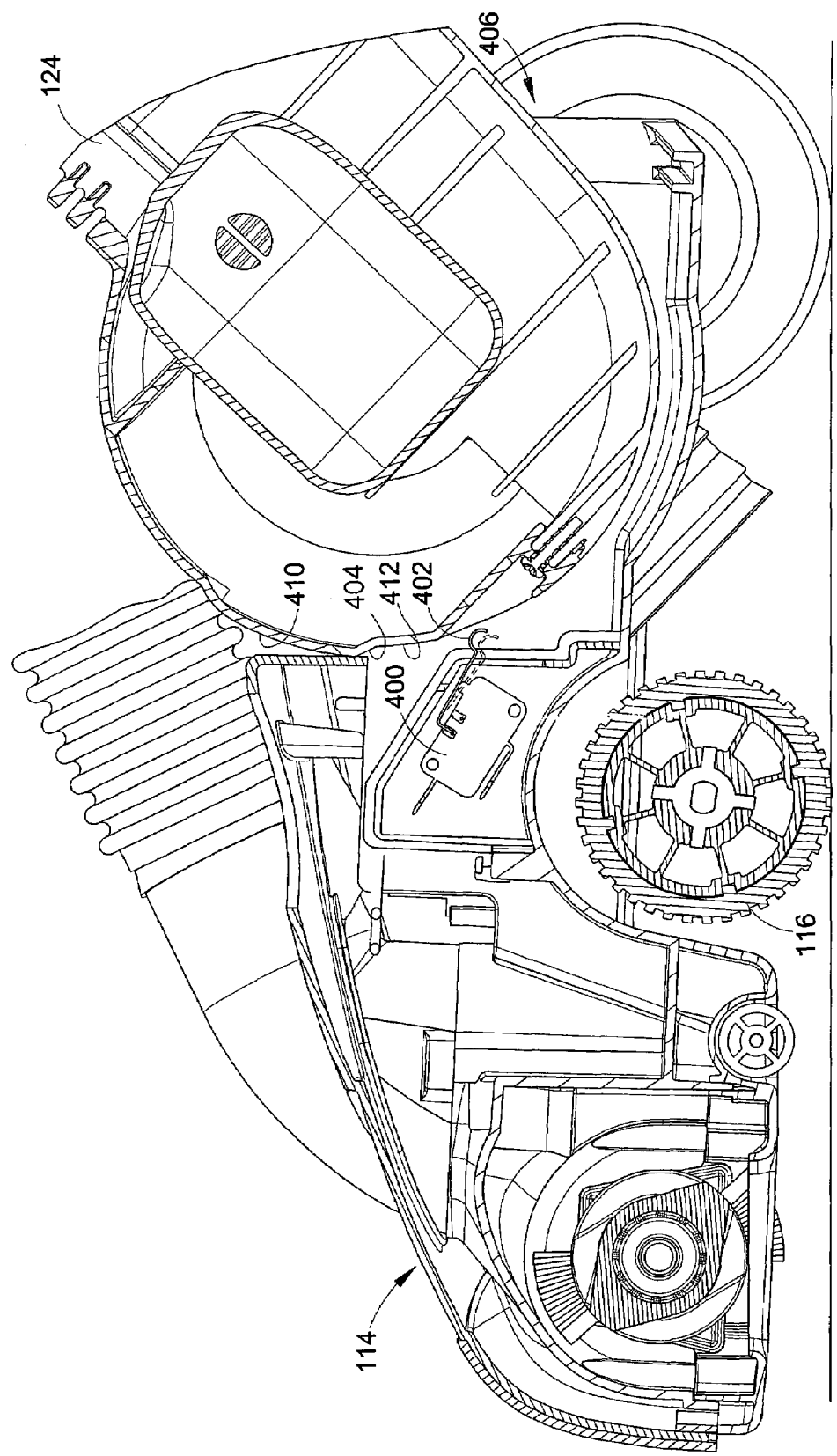
FIG. 4 is an elevation view and cutaway of the base and lower handle portion of the cleaner of FIG. 1.

For example, with reference to FIG. 3 and FIG. 4, the handle 118 may include an enable switch 212 for providing power or enabling the flow of power to various portions of the appliance or vacuum cleaner 126. The enable switch comprises a normally open microswitch whose actuator 214 is disposed to contact lever arm 216 so that movement of the lever arm effects movement of the actuator 214. More particularly, the lever arm 216 is hinged to pivot about pin 220 and effectively function as a trigger within the gripping portion 226 of the handle 118. The resistance to movement of the lever art 216 is very slight, merely the spring loading of the microswitch actuator 214, so that the gripping by user of the handle, and the actuation of the lever arm 216, are virtually undetectable to the user. The extent of travel of the lever arm 216 when gripped by the user, is accordingly slight, but significant enough to give the user a sense that the enable switch 212 is actuated, and when released, the enable switch 212 will be switched off. (In FIG. 2, the on position of the actuator 214 is shown in phantom line.)

The enable switch 212 is supported within the gripping portion 226 with the conventional mounting structure 232 assembled together with conventional fastening devices 292. The wiring for the microswitch 212 (not shown) extends down through the handle 118 to a control processor for enabling the communication of power to the drive as will hereinafter be more fully explained with reference to the control circuitry of FIG. 5.

Thus, the enable switch component of the subject invention comprises a means for the user to physically enable operation of a power drive for a self-propelled appliance only when the user's hand is grasping the grip portion 226 in a manner to swing the lever arm 216 to actuate the control switch 212. Any gripping of the handle in the manner otherwise than actuating the lever arm 216 will still preclude the operation of the self-propelled motor drive. The failure of any componentry within the cleaner, including the motor drive, when initially perceived by the user of the appliance, will allow the user to immediately release the grip, thereby releasing lever arm 216 and opening the enable microswitch 212 so that continued operation of the self-propelling motor drive is terminated. Although a microswitch is shown as the enable switch, other proximity switches may be employed, such as a light sensor, magnetic sensor or heat sensor.

With reference to FIG. 4, the structure and operation of a base switch 400 disposed in the base 114 is described. Similar to the enable switch 212, the base switch 400 comprises a microswitch having an actuator 402 disposed to engage an outer wall surface 404 of a lower end portion 406 of an upper housing portion 124 of the cleaner 122. The upper housing portion 124 is pivotally mounted to the base 114 in a conventional manner to allow the upper housing 124 and handle 118 to pivot through a range of movement for convenient use by user. Such pivoting operation is conventional and well known in the vacuum cleaner art as a part of the normal operation of an upright vacuum cleaner. However, the outer wall 404 of the lower housing portion 406 is not merely circular in its parameter, but rather includes a projection 410 extending radially, outwardly relative to cutout portion 412 so that as the lower housing portion 406 is pivoted between a fully upright position (shown in FIG. 4) to another position, the actuator 402 of the microswitch can be switched from an off position to an on position. More particularly, in the relative position as shown in FIG. 4, the upper housing portion 124 is in a fully upright position relative to the base 114. Such a relative position is one that is not intended for uses normally including a need for the self-propulsion operation so that when a user has disposed the handle in the fully upright position, it is appreciated that the self-propulsion operation should be disabled. Accordingly, it can be seen that the projection 410 in the outer wall 404 will engage the actuator 402 in a manner so that switch 400 interrupts the flow of power between the power supply and a motor driving the drive wheels 116. Conversely, when the upright housing portion 124 is pivoted by a user away from the fully upright position, it can be appreciated that the projection 410 will be moved away from the switch actuator 402 to the extent to allow the actuator to move the switch into a closed position for the communication of power from the power supply to the motor. In other words, it can be seen that recessed or cutout portion 412 will be disposed adjacent the actuator 402 so that the actuator can move into a second position away from the position shown in FIG. 4. The base switch 400 operates in a manner to switch the power on to communicate power from the power supply to the motor for the drive wheels 116.

The form of the projection 410 can take a variety of structures. For example, the cam can be formed by a projecting panel and it could be fastened to the outer wall 404. Alternatively, the microswitch can be a normally opened switch so that instead of a projection 410, the cutout is disposed over the same extent that is recessed from the outer wall 404 to give the same result.

Figure 5:
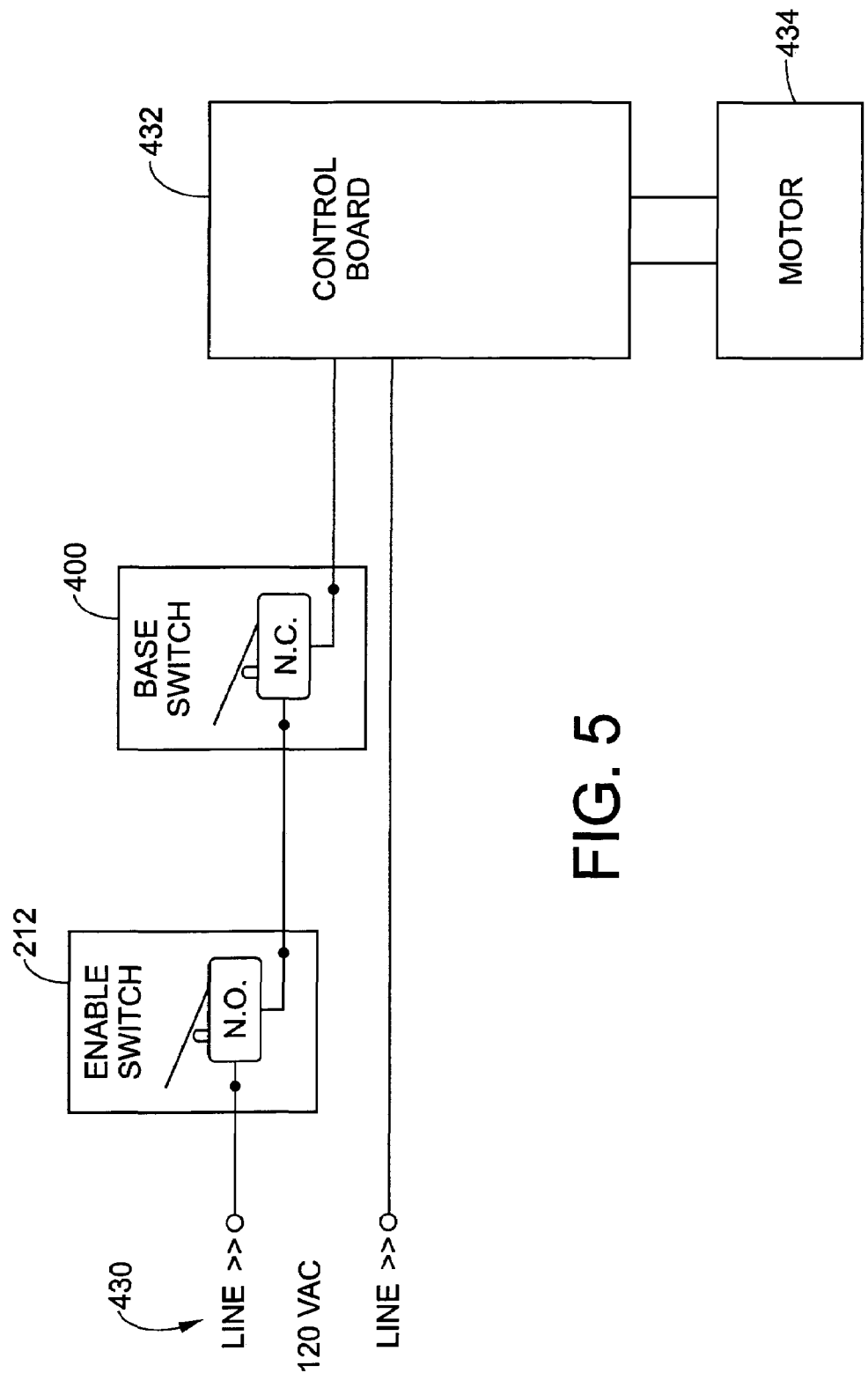
FIG. 5 is a schematic diagram of an enable/disable control circuit. Other signal conditioning or processing elements are shown in block form.

With reference to FIG. 5, the control circuitry schematic is shown wherein a power supply 430 normally supplied from an exterior line, but could comprise an onboard battery unit, is communicated to control board 432 for the control of the application of power to the motor drive 434 of the self-propelled vacuum cleaner. The subject invention is preferably employed with a direct drive motor unit, as is discussed in more detail in the incorporated co-pending application referenced above.

It can be seen that the enable switch 212 and the base switch 400 are connected in series so that only if both switches are actuated by physical operations of the user indicative of a desire for self-propulsion of the motor drive, only then will the drive wheels receive drive from the motor. The enable switch may comprise a normally open switch so that when a user releases the grip, power is interrupted. The base switch is a normally closed switch so that when actuated by disposition of the upper housing in a fully upright position, power will be interrupted. The serial conditioning of both switches provides improved safety for controlling the self-propulsion unit in only those circumstances when the user clearly intends its application.

Another advantage of the subject invention is that the disposition of the enable switch 212 in the handle 118 avoids the manufacturer with the requirements of having to go through elaborate Underwriters Laboratories testing for certification and approval. Without such circuitry, each and every component of the drive unit has to be analyzed in a manner (U.L. 199 test) relating to satisfying the safety concerns of electronic components relative to identification of a particular mean time between failures and likelihood of component failures. The provision of the enable switch minimizes the need for such analysis by providing a physical componentry which upon its release will cause a self-propelled unit to completely shutoff.

The invention has been described with reference to a particular embodiments. Modifications and alterations will occur to others upon a reading and understanding of the specification. It is intended that all such modifications and alterations are included insofar as they come within the scope of the appended claims or the equivalents thereof.

What is claimed is:

1. An appliance comprising:
   a base;
   a handle moveably depending from the base;
   an electric motor;
   a drive wheel operatively connected to the motor;
   a control circuit comprising an enable switch and a base switch for safely controlling the communication of power from a power supply to the motor relative to a gripping of the handle by a user of the appliance and selective positioning of the handle relative to the base, wherein the enable switch is disposed in a portion of the handle convenient for the gripping by the user and interrupts the power communication upon a release of the gripping, and the base switch is disposed to identify a relative position between the handle and the base indicative of a non-drive usage by the user and interrupts the power communication upon a disposition by the user of the handle in the relative position, whereby power to the motor is limited to circumstances including gripping and position adjustment of the handle by the user indicative of intended drive wheel operation.

2. The appliance of claim 1 wherein the electric motor is a direct drive motor.

3. The appliance of claim 1 wherein the enable switch comprises a lever arm extending from the handle portion disposed for selective operation during user drive operation of the appliance.

4. The appliance of claim 1 wherein the enable switch comprises a proximity switch for sensing the gripping of the handle by the user.

5. The appliance of claim 4 wherein the proximity switch comprises one of a light sensor, magnetic sensor or heat sensor.

6. The appliance of claim 1 wherein the base switch comprises a proximity switch for sensing the handle in an upright position.

7. The appliance of claim 6 wherein the proximity switch comprises a cam and microswitch assembly.

8. An upright vacuum cleaner having a direct drive motor assembly providing selective self-propulsion to the cleaner and an enable circuit for controlling the supply of power to the motor assembly, the enable circuit comprising a proximity switch disposed in a grip portion of a handle to identify a gripping and release of the cleaner by a user, and further disposed in effective series between the motor assembly and a power supply, whereby safe operation of the cleaner is enhanced by the interruption of power to the motor assembly upon the release of the handle grip by a user, and further including a base switch circuit disposed in series with the enable circuit for interrupting power from the power supply to the motor assembly when the handle is in an upright position indicative of no need for self-propulsion of the cleaner.

* * * * *